US009323345B2

(12) United States Patent
Huang et al.

(10) Patent No.: US 9,323,345 B2
(45) Date of Patent: Apr. 26, 2016

(54) SYSTEM CAPABLE OF ACCOMPLISHING FLEXIBLE KEYBOARD LAYOUT

(75) Inventors: Xiaofeng Huang, Shanghai (CN); Yanjiao Zhao, Shanghai (CN); Jingfen Dai, Shanghai (CN)

(73) Assignee: SHANGHAI CHULE (COOTEK) INFORMATION TECHNOLOGY CO., LTD., Shanghai (CN)

( * ) Notice: Subject to any disclaimer, the term of this patent is extended or adjusted under 35 U.S.C. 154(b) by 1126 days.

(21) Appl. No.: 12/988,468

(22) PCT Filed: Apr. 20, 2009

(86) PCT No.: PCT/CN2009/071351
§ 371 (c)(1),
(2), (4) Date: Dec. 16, 2010

(87) PCT Pub. No.: WO2009/127168
PCT Pub. Date: Oct. 22, 2009

(65) Prior Publication Data
US 2011/0090151 A1  Apr. 21, 2011

(30) Foreign Application Priority Data

Apr. 18, 2008  (CN) .......................... 2008 1 0036302

(51) Int. Cl.
*G06F 3/023* (2006.01)
*G06F 3/0488* (2013.01)
*G06F 3/0486* (2013.01)

(52) U.S. Cl.
CPC ............ *G06F 3/0237* (2013.01); *G06F 3/0486* (2013.01); *G06F 3/04886* (2013.01)

(58) Field of Classification Search
CPC .......................... G06F 3/04886; G06F 3/0486
USPC ................... 345/173–179, 168, 172; 341/26; 715/780, 810, 818
See application file for complete search history.

(56) References Cited

U.S. PATENT DOCUMENTS

| | | | | |
|---|---|---|---|---|
| 7,310,053 B2* | 12/2007 | Bollman | ......................... | 341/22 |
| 2004/0046744 A1* | 3/2004 | Rafii et al. | ..................... | 345/168 |
| 2005/0024324 A1* | 2/2005 | Tomasi et al. | ................. | 345/156 |
| 2005/0060273 A1* | 3/2005 | Andersen et al. | ................. | 707/1 |
| 2006/0028450 A1* | 2/2006 | Suraqui | .......................... | 345/169 |
| 2007/0074131 A1* | 3/2007 | Assadollahi | .................. | 715/816 |
| 2007/0216651 A1* | 9/2007 | Patel | .............................. | 345/168 |
| 2008/0204423 A1* | 8/2008 | Kim | ................................ | 345/173 |
| 2009/0070098 A1* | 3/2009 | Patryshev | ......................... | 704/3 |

FOREIGN PATENT DOCUMENTS

| | | |
|---|---|---|
| CN | 101021763 | 8/2007 |
| CN | 101266520 | 9/2008 |
| JP | 2003-22157 | 1/2003 |

(Continued)

*Primary Examiner* — Shaheda Abdin
(74) *Attorney, Agent, or Firm* — Novick, Kim & Lee, PLLC; Allen Xue

(57) ABSTRACT

A system of implementing flexible keyboard layout for inputting text into an electronic device, where a user's input is mapped to a character set based on a keyboard layout, and an input sequence is formed. The user may customize different keyboard layouts and switch among these different layouts arbitrarily. Also, an auto error-correction may be achieved, and smart words selection may be achieved based on context. With the system of the invention, the design cost of the portable device manufactures may be reduced significantly.

6 Claims, 14 Drawing Sheets

(56) References Cited

FOREIGN PATENT DOCUMENTS

| JP | 2008-547096 | 12/2008 |
| KR | 20050048978 | 5/2005 |
| WO | 2007/086371 | 8/2007 |
| WO | 2007/114833 | 10/2007 |

\* cited by examiner

SYSTEM CAPABLE OF ACCOMPLISHING FLEXIBLE KEYBOARD LAYOUT

FIELD OF THE INVENTION

The present invention relates to the field of electronic devices, and particularly to the field of information input to electronic devices. More particularly, the invention relates to a system implementing a flexible keyboard layout for users to input text on electronic devices.

BACKGROUND

Nowadays, with the development of integrated circuit (IC) technology, a variety of electronic devices have emerged, for example, a palmtop computer, a smart phone, an embedded system, a portable computer, etc., on which a full-size hardware keyboard can not be equipped due to the constraints of dimension, manufacture cost, etc. As a result, it is challenging to input on such devices.

A keyboard of conventional mobile phones or portable devices employs compound keys, each associated with a plurality of characters. With supporting software and dictionary files, the word that a user desires to input is predicted according to the sequence of the keys pressed by the user. A common inputting method is to create a trie tree for the sequence of pressed keys and a particular sequence of pressed keys may fixedly correspond to a plurality of words. When the user presses keys, the trie tree is searched according to the sequence of pressed keys to find and display a plurality of corresponding candidate words on a display for user to choose. Such a method is closely associated with the keyboard layout concerning dictionary structure, such that whenever the keyboard layout is changed there is a need to reconstruct the dictionary structure and even to redesign the software. Particularly, for a software keyboard on a touch screen, the method has poor flexibility. Firstly, the keyboard layout can not be changed flexibly. If the layout of letters is changed, for example, from a QWERTY standard computer keyboard layout (as commonly used in USA and Asia) to an AZERTY keyboard layout (as commonly used in Europe), the software and dictionary file have to be rewritten entirely. Secondly, it can not achieve smart correction. If the user presses one or more keys in error, it can not display the corrected word. Thirdly, it can not input the words not included in the dictionary, for example, some names of person, addresses, Email addresses, specific terms, etc.

Meanwhile, due to the reduced size of keyboard, the user is prone to press by mistake, particularly to press the adjacent keys. Accordingly, it is very useful to achieve a function of auto-correction in software. One commonly used auto-correction method utilizes the search for a list of common errors to achieve the auto-correction function. For example, users usually misspell the word 'can' into 'csn', since on the keyboard of QWERTY layout, character 'a' is located next to character 's', which tends to be pressed by mistake. The method refers to a predetermined list of common errors which comprises sequences of pressed key in error and correct words, for example, 'csn'→'can', to modify a sequence of pressed keys in error into a correct word. However, the limitation of the method is apparent where it can determine only limited known mistake types but can not make effective recognition of more general adjacent key press errors, and it is readily subject to misjudgment.

Another auto-correction method is employed which determines the position of a contact point on the touch screen, computes the distances of the contact point to each key, computes weighted distances of the sequence of pressed keys to every possible word, and chooses the word in the dictionary which has the shortest weighted distance. While feasible in theory, it is too complex to be achieved in practice considering the limited computing capability of general portable devices.

SUMMARY

The object of the invention is to overcome the shortcomings of prior art as described above. A system of changing a keyboard layout flexibly and having a smart error-correction function is provided, which has several advantages over conventional methods:

First, the system of the invention may adopt various keyboard layouts flexibly. It is needed for a device manufacture to spend considerable efforts to alter original software and input system or purchase new software for each new language or input method. With the system of the invention, it merely needs to define a new keyboard layout, without altering the supporting software. It provides a convenient and facile scheme to localize the version of multi-language. Also, the user may customize the keyboard layout according to his or her use habit, hence it is flexible and helpful.

Second, a more effective and helpful error-correction method is accomplished in the system of the invention, which solves the problem of frequent pressing by mistake on a keyboard of reduced size. By contrast with two conventional error-correction methods, a quick and comprehensive error-correction method may be achieve with limited computing capability of ordinary portable devices, and may allow user to set the scope of error-correction, which is a really practical error-correction method.

Thirdly, the system of the invention may determine candidate words which are most suitable for current context based on the context of text in combination with the analysis of syntax, thereby improving the accuracy of candidate words.

According to an aspect of the invention, it is provided a system implementing a flexible keyboard layout for inputting into an electronic device, including: an input module configured to detect user input; a layout mapping module connected to the input module, where the layout mapping module is configured to map at least one input by the user to at least one corresponding character set according to a current keyboard layout; a dictionary module, configured to store candidate words; a candidate word module connected to the dictionary module and the layout mapping module, where the candidate word module is configured to generate an input sequence based on a plurality of corresponding sets of characters, find and prioritize possible candidate words based on the input sequence; and an output module connected to the candidate word module, configured to output the candidate words.

According to another aspect of the invention, it is provided a method implementing a flexible keyboard layout for inputting text on an electronic device, including: a first step of waiting for a user input; a second step of mapping the user input to a character set according to current keyboard layout, where the said character set contains characters possibly corresponding to the user input; a third step of adding the character set into a current input sequence; a fourth step of generating candidate words and sequencing the said candidate words based on priority; and a fifth step of displaying the said candidate words.

According to another aspect of the invention, it is provided a method of fast switching a keyboard layout, including: a first step of displaying a keyboard layout on a touch-sensitive display device; a second step of waiting for movement of user's contact point on a touch screen; a third step of moving an original keyboard layout out of the screen along the direction of movement of the user's contact point; and a fourth step of moving a new keyboard layout into the screen along the direction of movement of the user's contact point.

According to still a further aspect of the invention, it is provided a method of dynamically changing a keyboard layout, including: a first step of displaying a plurality of keys on a touch-sensitive display device; a second step of detecting an act of moving a contact point by a user after a key is pressed; a third step of detecting a position where the user releases the contact point; and a fourth step of adjusting the keyboard layout where the key is adjusted to a position corresponding to the position where the key is released, and displaying an updated keyboard layout.

BEST EMBODIMENTS OF THE INVENTION

Figure 1A:
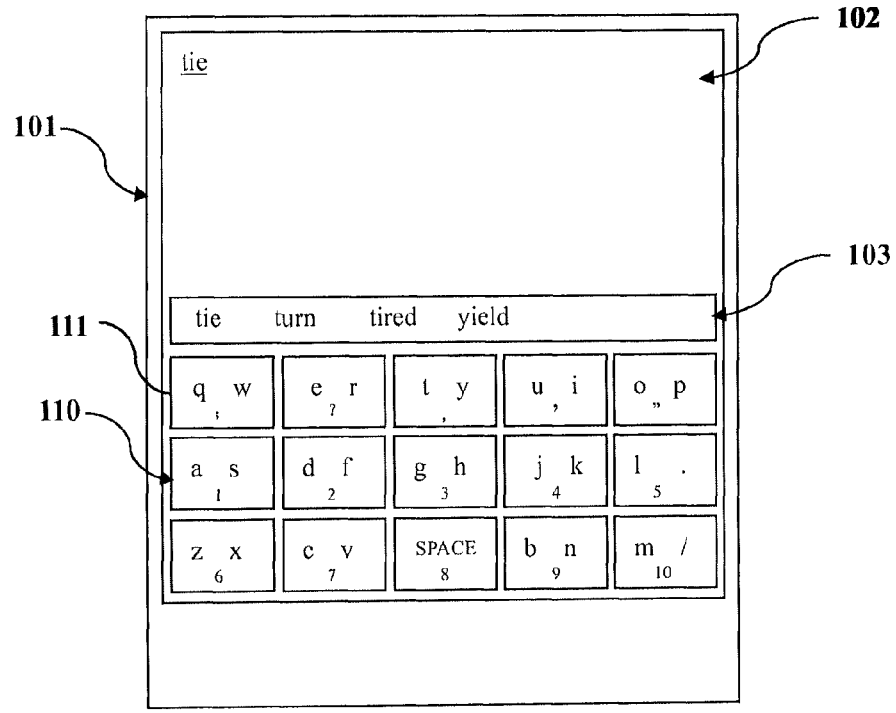
FIGS. 1A-1E are schematic diagrams illustrating different kinds of keyboard layouts according to embodiments of the invention.

Prior to describing the embodiments according the invention in detail, it should be noted that the embodiments mainly rest with the combination of steps of methods and device components for inputting text to an electronic device. Thus, the device components and steps of methods have been indicated in place in the drawings with common symbols, and only the details relating to the understanding of the embodiments of the invention are shown so as not to obscure the disclosure of the invention due to the details apparent for the ones skilled in the art.

In the description, the relationship terms, such as left and right, up and down, before and after, and the first and second, are merely used to distinguish one entity or action from another entity or action, and do not necessarily require or imply any actual such relationship or order between such entities or actions. The terms 'including', 'containing' or any other variant are intended to cover non-exclusive inclusion, which makes the processes, methods, materials or equipment including a series of elements, not only include these elements, but also include other not explicitly listed elements, or inherent element in such processes, methods, materials or equipment.

For the purpose of disclosure herein, the term 'keyboard' is defined generally which includes any inputting part with a certain area, including but not limited to, a hardware mechanical keyboard, a hardware sensitive keyboard, a software keyboard on a touch screen, and the like. Embodiments of the invention herein are described with reference to the software keyboard on touch screen by way of examples. However, persons skilled in the art shall appreciate that the method and system of the invention may apply to hardware keyboards.

1. Basic Function and Operation

Figure 1B:
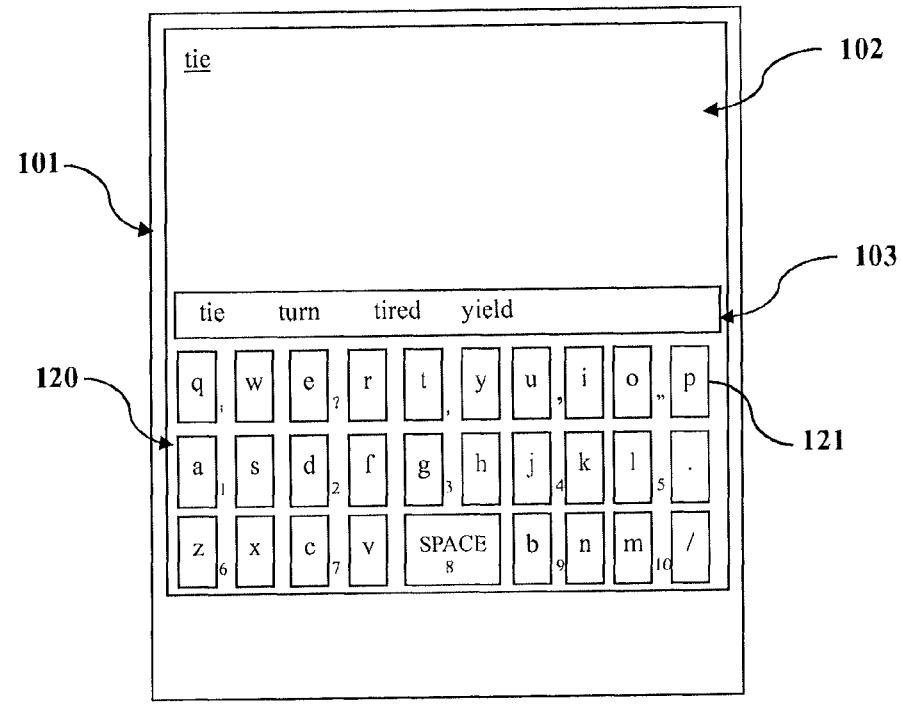
Figure 1C:
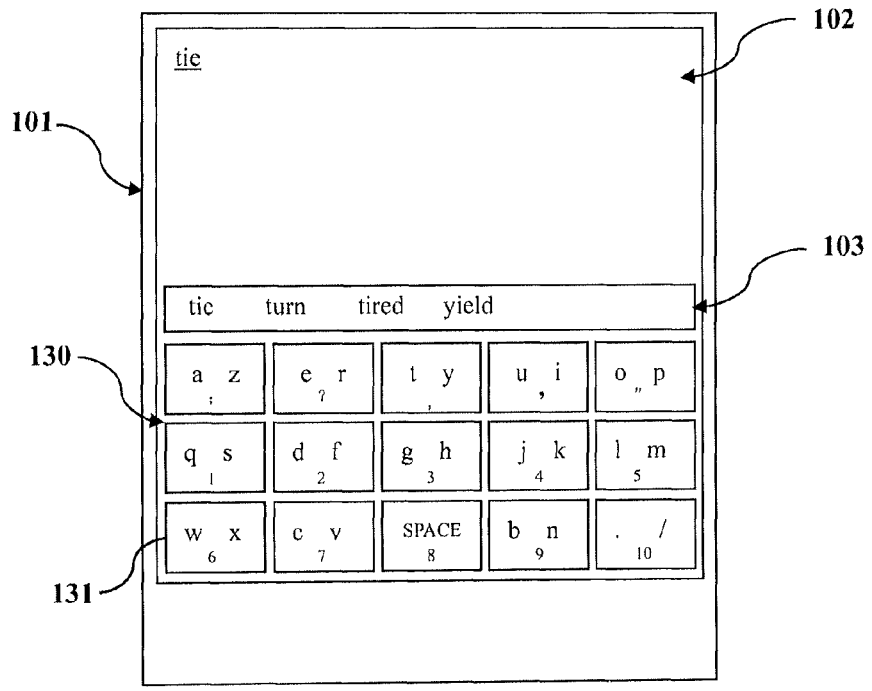
Figure 1D:
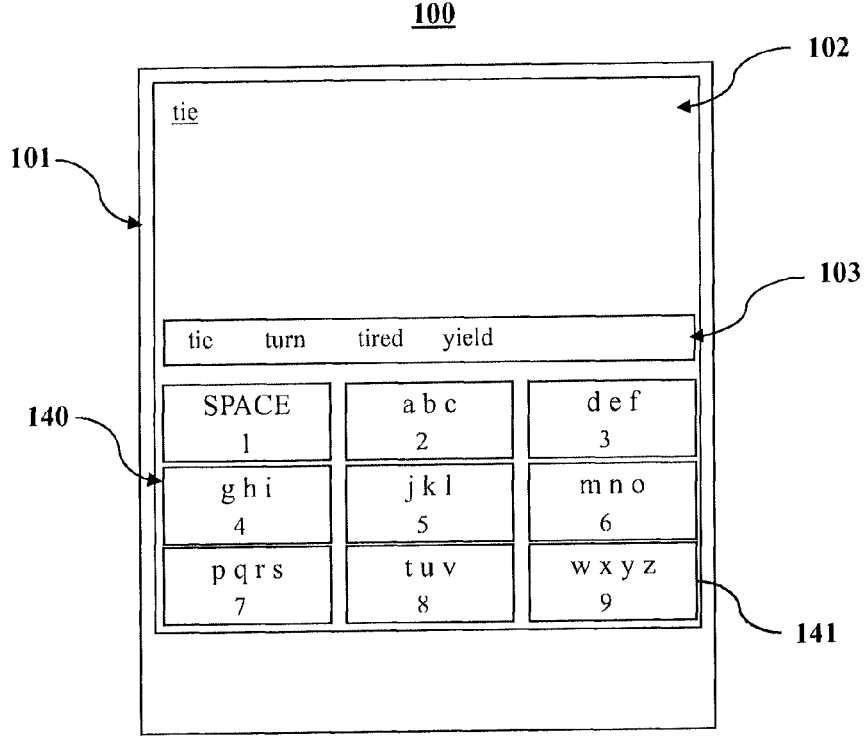
Figure 1E:
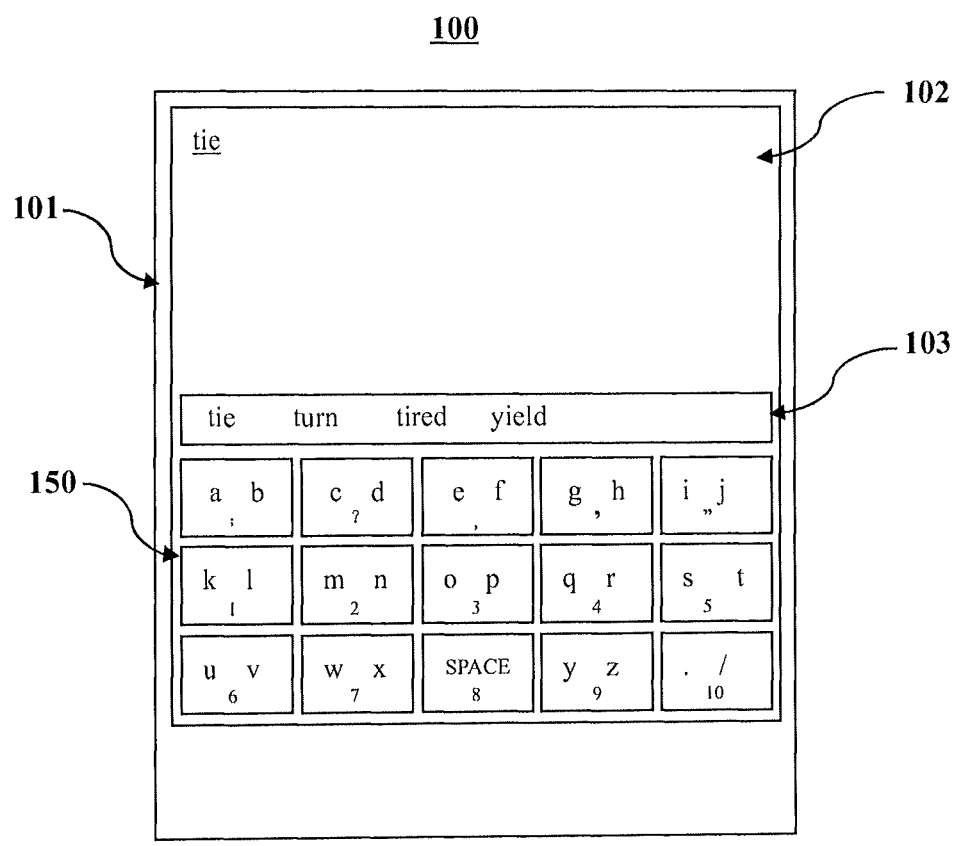

FIG. 1A illustrates a keyboard system 100 of the invention which may implement a flexible keyboard layout and a portable device 101 carrying the keyboard system 100. When a user presses keys on a keyboard 110, the inputted contents are displayed in a text region 102. The keyboard 110 is the QWERTY layout and includes 26 English letters, numbers, symbols and space key, where each key may represent three characters. FIG. 1B illustrates a keyboard 120 of another layout, a single key QWERTY layout, where each key represents one character and there may be numbers and symbols between two keys. FIG. 1C illustrates a keyboard 130 of a further layout, AZERTY layout, where each key may represent three characters. FIG. 1D illustrates a keyboard 140 of yet another layout, a nine-key layout, which is widely used in mobile phone keyboards, where each key may represent three or four characters and one number. FIG. 1E illustrates a keyboard 150 having a layout customized by the user, where each key may represent three characters, and the contents and order of the characters are customized by the user based on usage pattern.

For the purpose of disclosure herein, for the clarity of the reference number in annexed Figures, the central characters on the first line of each key in the respective keyboard layouts are used to identify each key in the description below. For example, key 'qw' is used to identify the key 111 on the top left corner of the keyboard in FIG. 1A; key 'p' to identify the key 121 on the top right corner of the keyboard in FIG. 1B; key 'wx' to identify the key 131 on the bottom left corner of the keyboard in FIG. 1C; and key 'wxyz' to identify the key 141 on the bottom right corner of the keyboard in FIG. 1D. When a duplicate identification defined in above manner occurs in the same drawing, serial numbers may be used to make distinction, ensuring the uniqueness of the identification manner.

It shall be noted that the method as described herein may apply to other languages in addition to English, and other keyboard layouts. Moreover, the contents and positions of characters, numbers and symbols may vary in any manner.

Referring back to FIG. 1A, when the user clicks the keys on a key entry region which may generate a sequence of key entry, the system will display candidate words in a candidate region 103 while displaying a default candidate word in a text region. When the use clicks on a candidate word or presses a confirmation key (e.g., space key or some interpunction), the selected word will be input to the text region 102.

For example, in FIG. 1A, when the user presses keys 'ty', 'ui', 'er' in sequence, the system finds all the words in the dictionary which correspond to the key entry sequence and displays them in the candidate region 103 in order. The words 'tie', 'turn', 'tired', and 'yield' are displayed on the first page of the candidate word list due to their highest word frequencies. Meanwhile, the word 'tie' is also displayed in the text region as default candidate word and is identified with a particular format (such as underline) indicating that the text is not confirmed yet. When the user presses the space key, the candidate word will be confirmed and inputted into the text. Since it can not be determined explicitly which character is represented by each key entry when the user presses keys, and the candidate words are matched by a dictionary, such a method is referred to 'ambiguous input'.

According to some embodiments of the invention, the user may make precise input as well. For example, referring to FIG. 1A, in case of keyboard 110 of the touch screen, the user may press key 'ty', slide left and then release it, resulting in a precise input of character 't'; press key 'ui', slide right and then release it, resulting in a precise input of character of 'i'; and press key 'er', slide right and then release it, resulting in a precise input of character of 'r'. Now the system may find all the words beginning with 'tir': 'tired', 'tiring', 'tire', and 'tirade'.

According to some embodiments of the invention, the user may slide the contact point downwards to input the symbol or number at the bottom of the keys. For example, referring FIG. 1A, the user may move the contact point on the key 'gh' downwards and the number '3' is input. As such, the user may not need to switch the special number mode or symbol mode.

As a further example, referring to FIG. 1B, the user may move the contact point on the key 'q', or 's' or their central region downwards to input the symbol ';' therebetween.

According to some embodiments of the invention, symbols and numbers may also be part of a word, for example, 'I'm', 'I'll', 'let's', 'C++', 'part-time', and the like. The user may conveniently enter symbols or numbers ambiguously in the same keyboard mode without switching to another symbol mode. For example, referring to FIG. 1A, in case of keyboard 110, inverted comma ''' is on key 'ui'. The user merely needs to press 'ui', 'ui', and 'ui' in sequence, and the system can find the word 'I'm' and display it in the candidate region.

According to some embodiments of the invention, when the user wants to change the keyboard layout, for example from the QWERTY layout of FIG. 1A to the nine-key layout of FIG. 1D, there's only one predefined act required to achieve the fast switch. For example, on the keyboard of the touch screen, the user may slide fast with fingers from left to right on the keyboard region and a contiguous dynamic effect can be achieved where the QWERTY layout moves right and out of the screen and the nine-key layout moves in from the left on the screen. Similarly, the user may switch to the single key QWERTY layout of FIG. 1B, the AZERTY layout of FIG. 1C, or the user custom layout of FIG. 1E. The layout may be switched in various ways, for example, through the detection of the user gesture, through the use of a specified key, and through voice control. In such a switching, due to the independence of the system layout to the search functionality of dictionary, the same dictionary file and software may be used.

In case of small keyboard region, the user often presses the adjacent keys by mistake during inputting. Such mistakes may be corrected automatically based on the dictionary according to an embodiment of the invention. For example, in FIG. 1B, the user is likely to press key 'f' in error when he or she wants to press key 't'. The system will search the keys 'r', 'g', 'd', and 'v' surrounding the key T, and determine the possibly correct word based on the user's previous input. In the embodiment of the invention, even when all of the characters inputted by the user are wrong, the system can also find the correct word. For example, the user may input 'v', 'i', 'p', and 'l', and the system may prompt the user of candidate word 'book', since 'v', 'i', 'p', and 'l' are the adjacent characters of 'b', 'o', 'o', and 'k', respectively. It shall be noted that, when spacing between the characters is large, it needs to extend the range of error correction (such as the correction for an error of characters separated by two keys). The negative side of extending the error correction range is the increasing of candidate words. To solve this problem, in one preferred embodiment of the invention, the range may be adjusted based on the user's preference. The user may set the range of the pressed key in which the error correction will be conducted. For example, the error correction will be conducted among all of the adjacent characters, among only the horizontally adjacent characters, among only the vertically adjacent characters, or among characters separated by two characters (e.g., 't' and 'u'), or no error correction is conducted.

Figure 2A:
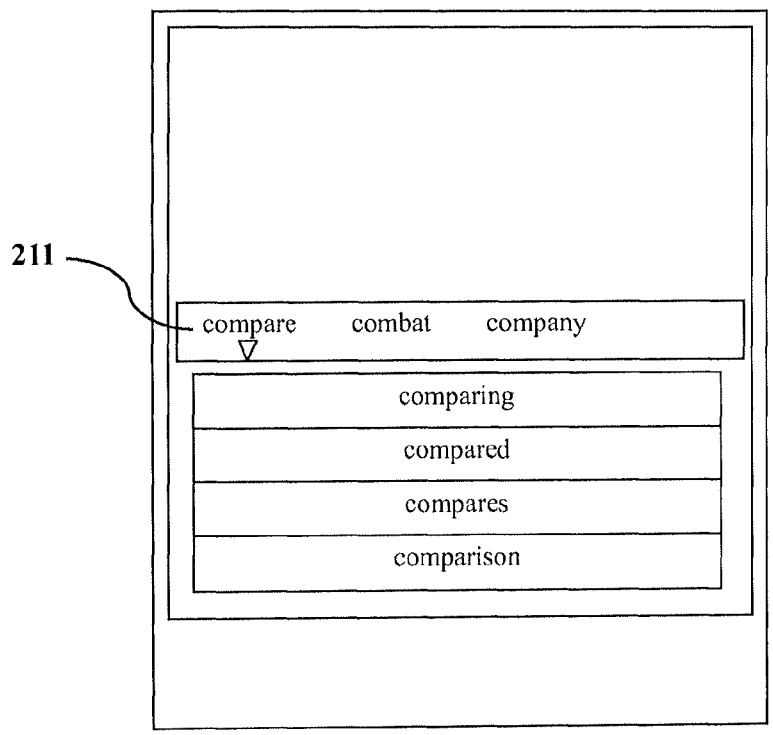
FIG. 2A is a schematic diagram illustrating a kind of candidate words and its relevant words according to embodiments of the invention.

According to some embodiments of the invention, the relevant words of the candidate words may be selected quickly. For example, referring to FIG. 2A, when the candidate word 211 'compare' occurs in the candidate region, the user may slide the contact point on the 'compare' downwards, the relevant words corresponding to 'compare' such as 'comparing', 'compared', 'compares', and 'comparing' occur in the keyboard region. The user may click on one of the relevant words and input it into the text region. Such relevant words are very common in kinds of languages. For example, in English a verb has many tenses, a noun has plural form, and a word has kinds of part of speeches, etc. In the embodiments of the invention, these words can be correlated together whereby the user may extend to other relevant words from one candidate word quickly.

Figure 2B:
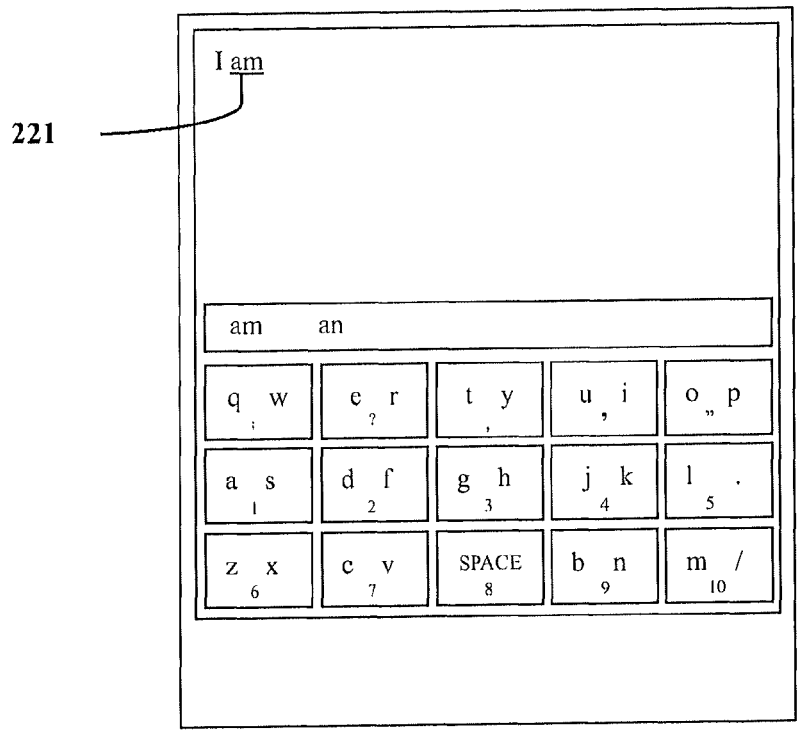
FIG. 2B is a schematic diagram illustrating the determination of candidate words from context according to embodiments of the invention.

According to some embodiments of the invention, the candidate words can be correlated according to the context of the text and hereby a phrase prediction may be provided. For example, referring to FIG. 2B, the user inputted previously 'I' and subsequently needs to input 'am'. However, when inputting 'm', the adjacent key 'bn' is pressed instead. Now, according to a rule of contextual association, the system may decide that 'I am' is common used phrase and adjust the candidate word 221 'am' to have a higher priority than the original candidate word 'an'. Such phrases, specific collocation, and conventional syntax are very common in many languages. Accordingly, the probability of occurrence of a word not only depends on the word frequency thereof, but also depends, even more, on the probability of collocation between the word and the context. In this example, 'an' is a word with a higher word frequency than 'am', nevertheless what follows 'I' is almost always 'am' rather than 'an'. Therefore, selecting appropriate words according to context may substantially improve the effectiveness of word selection and, as a result, the efficiency of input. As a further example, referring to FIG. 2C, having inputted word 'look', the candidate words which can form phrase collocation with the word 'look' can be predicted automatically in the candidate word list for choosing by the user, e.g., 'forward to', 'at', 'into', and 'for'.

According to some embodiments of the invention, it is provide a context correlation and phrase association on the basis of relevant words. For example, referring to FIG. 2D, when the user inputs the relevant word 'looking' of the word 'look', the phrase collocation, such as 'forward to', 'at', 'into', and 'for', corresponding to 'look' can still be predicted in the candidate word region.

2. Structure and Principle of System

Figure 3:
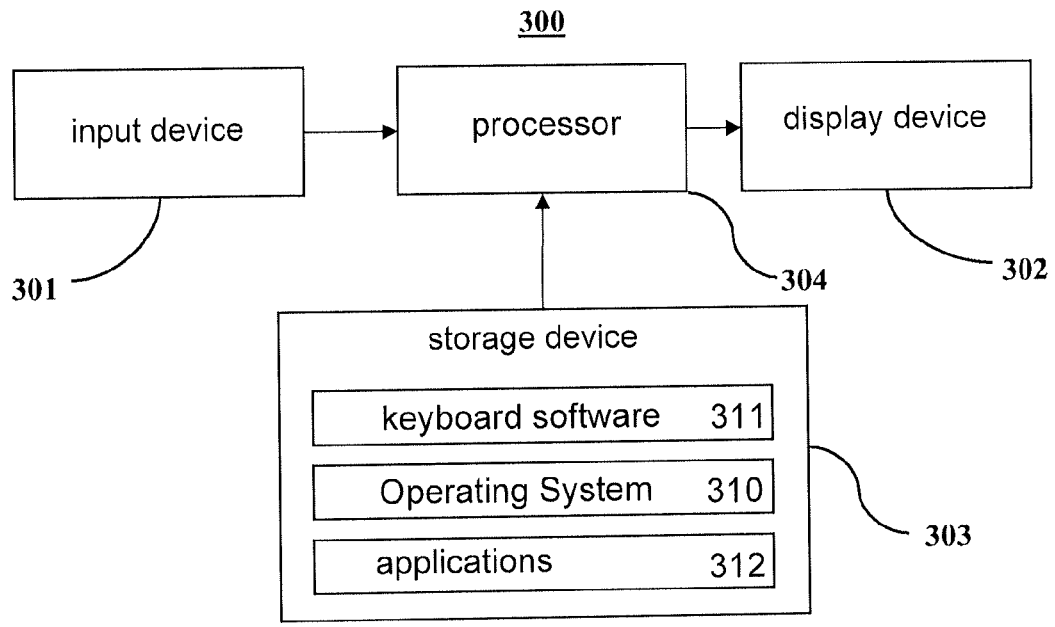
FIG. 3 illustrates a hardware block diagram according to embodiments of the invention.

FIG. 3 illustrates a general block diagram of a portable device 3 for use in the invention. An input device 301, a display device and a storage device 303 are coupled with a processor 304 through electric circuits. The input device 301 may be a keyboard or a touchpad; the display device may be an LCD screen; and the storage device 303 may be any memory media, for example, a random access memory (RAM), a Read Only Memory (ROM), a Flash memory, a hard disk, etc.; the processor 304 may be a CPU or ASIC chip. In many cases, the input device 301 may also be integrated with the display device 302, for example, as a touch screen. The storage device 303 may store all of the software, including a Operating System 311 and a keyboard software 310 involved in the invention. Optionally, the storage device may also contain other applications 312, including a text editor, etc.

Figure 4:
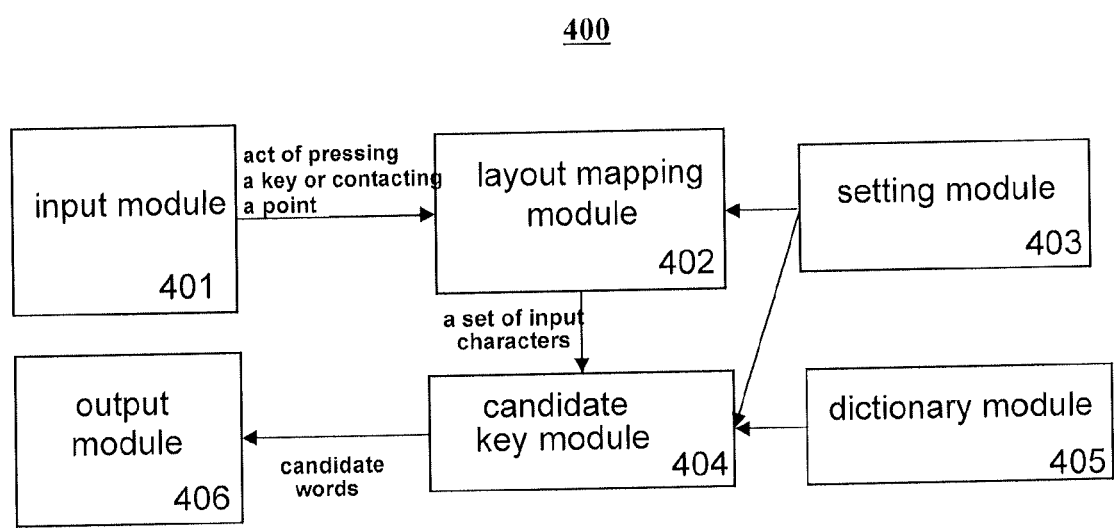
FIG. 4 illustrates a structure diagram of system modules according to embodiments of the invention.

The keyboard software 310 manages the keyboard system of the invention. FIG. 4 illustrates a preferred structure of system 400 of the keyboard software. The system may mainly include a input module 401, a layout mapping module 402, a setting module 403, a candidate word module 404, a dictionary module and an output module 406.

The input module 401 is responsible for the detection of the user input, for example, the key entry of the user, the contact on touchscreen and the like, and outputs to the layout mapping module 402. The user input may be mapped according to the present keyboard layout by the layout mapping module to a character set corresponding the present input, which is then outputted to the candidate word module 404. The dictionary module is responsible for providing the candidate word module 404 with words in the dictionary. The candidate word module 404 is responsible for composing an input sequence by the inputted character sets, searching for and sequencing the possible candidate words according to the input sequence. The output module 406 is responsible for outputting the candidate words for user to choose. The setting module 403 may store user and system settings, for example, whether to enable error correction, whether to detect context, which may be used by the layout mapping module 402 and the candidate word module 404.

Figure 5:
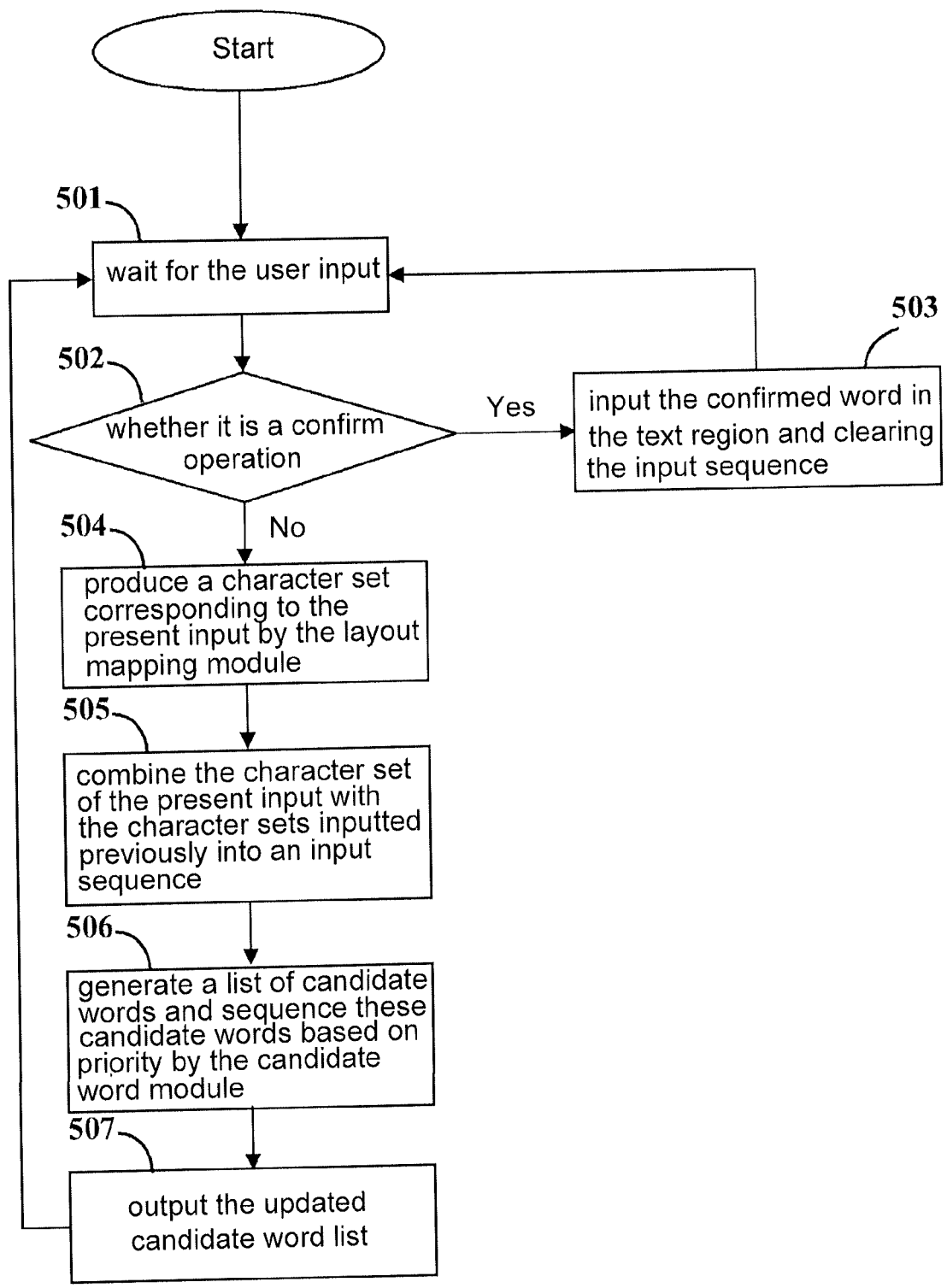
FIG. 5 is a flow diagram illustrating the completing of one key input process according to embodiments of the invention.

FIG. 5 illustrates a main flow 500 of an operation performed by the primary program of the keyboard software when selecting words after a user input is entered. The flow includes the steps of: waiting for the user input (step 501); determining whether it is a confirm operation (step 502); if so, inputting the confirmed word in the text region and clearing the input sequence (step 503); otherwise, producing the character set corresponding to the present input by the layout mapping module 402 (step 504); combining the character set of the present input with the character sets inputted previously into an input sequence (step 505); generating a list of candidate words and sequencing these candidate words by the candidate word module (step 506); and outputting the updated candidate word list (step 507).

Regarding step 502, the input module 401 may determine whether the present input is the confirm operation. The confirm operation may be pressing the space key or confirm key (to select the default candidate word), clicking on the candidate word directly, selecting the candidate word through a navigation key and then pressing the space or confirm key, inputting a punctuation to select the default candidate word automatically, or any other predetermined operation.

Regarding step 504, the layout mapping module 402 may map the present input to the corresponding character set according to the present keyboard layout. The character set may contain all the characters corresponding to the present input. For example, when the key 'qw' is pressed by the user in the QWERTY keyboard layout shown in FIG. 1A, then the character set may contain the ambiguous input characters 'q' and 'w' on the key. When the error correction is set, then the character set may contain adjacent characters such as 'a', and 'e'.

Regarding step 505, the candidate word module 404 may add the present character set to the input sequence. For example, in case of the QWERTY keyboard layout as shown in FIG. 1A, when the user has pressed keys 'ty', 'ui', and 'er' in sequence, the input sequence may contain the character sets {'t', 'y'}, {'u', 'I'}, {'e', 'r'} inputted for each press. Then, the candidate word module 404 may search for the possible candidates such as 'tie' and 'turn' according to all kinds of possible combinations. Finally, the candidate words may be sequenced by preference order. In some preferred embodiments, the candidate word with the highest priority may be designated as the default candidate word, i.e., when the user presses the space key or some other symbol, it will be confirmed automatically that the default candidate word will be inputted into the text region.

Regarding step 506, the output module 406 may display the updated candidate word list on the screen for user to choose. In some embodiments, the default candidate word may be displayed and highlighted in a particular format in the text region.

Referring back to FIG. 4, the methods for implementing each module in the present embodiment are described below.

The user's key entry operation is detected and the relevant data of each key entry is recorded and outputted by the input module 401. The relevant data of one key entry may include, but not limited to:

The starting position where the user presses the contact point

The ending position where the user releases the contact point

The trajectory of the contact point being moved by the user

The dwell time during which the contact point is maintained by the user

For example, in FIG. 1A, when the user presses the key 'qw', moves rightwards and then releases it, the output from the output module 401 may include the starting position and ending position where the user presses and releases the key, respectively.

Referring back to FIG. 4, the setting module 403 may include kinds of setting information related to the operation of system, including user preference, operation modes of system, and the like. For example, the user may disable the error correction. In such a way, pressing the adjacent keys in error will not be corrected. As a further example, the user may choose to the error-correction level such that the error correction will be conducted among only the left-right adjacent keys, among only the up-down adjacent keys, among only the surrounding keys, or among keys separated by two layers of keys (e.g., if key 'g' is pressed in the single key QWERTY layout as shown in FIG. 1B, the error correction will be conducted up to 'd', 'f', 'h', and 'j').

Referring back to FIG. 4, the layout mapping module 402 may have the following three main functions.

Figure 6:
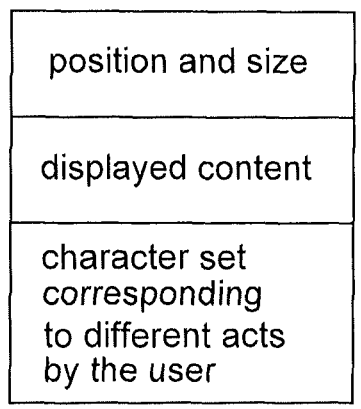
FIG. 6 is a schematic diagram illustrating the information contained in each key in a layout module according to embodiments of the invention.

First, the layout mapping module 402 defines and stores various layout parameters of different keyboards, such as what characters are on the keyboard, what characters are combined on the same key, how to select the characters on the keys precisely, and the like. For example, in FIG. 1A, the characters 'q', 'w', and symbol ';' are combined into one key 'qw'. FIG. 6 illustrates a data structure describing the key 'qw' stored in the memory, which may include, but not limited to following fields:

The position and size of the key on the area of keyboard layout

The characters displayed on the key and corresponding positions thereof: 'q', 'w', ';'

The character set corresponding to different user actions:
Click and release immediately: ambiguous input of 'q', 'w', ';'
Move upwards: ambiguous input of capital 'q', 'w' ('Q', 'W')
Move leftwards: precise input of 'q'
Move rightwards: precise input of 'w'
Move left-upwards: precise input of 'Q'
Move right-upwards: precise input of 'W'
Move downwards: precise input of ';'

Figure 7:
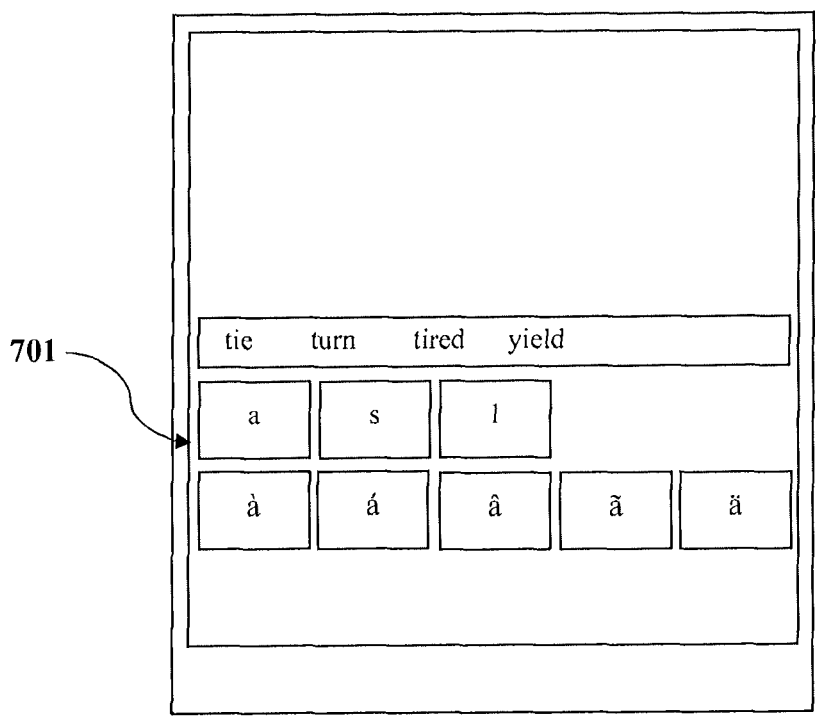
FIG. 7 is a schematic diagram illustrating the expanding of one key for precise input according to embodiments of the invention.

There're many manners in which the precise input is achieved. One preferred method is to determine the character inputted precisely according to the moving of the contact point by the user; another preferred method is to press and hold a key to expand the plurality of characters on the key for choosing by the user. For example, in FIG. 1A, when the user presses and holds the key 'as' for a period exceeding a preset time, the keyboard will expand to a precise input mode as shown in FIG. 7 and exhibit the whole of the character set 701 represented by the key for user to choose. It returns to the initial mode as shown in FIG. 1A after selection. In European languages, the accent characters such as 'ààâäā' may be selected in such a manner.

Please be noted that, the fields of the data structure may be deleted or modified as needed, without departing from the essential of the invention. For example, an additional field may be added to describe whether to display an enlarged image above a key after the key is pressed for prompt of current input of the user. As a further example, when the position or size of a key is fixed, the field related to the position or size of the key on the keyboard area may be omitted. Moreover, the definitions of different touch operations by the user are extensible. For example, it can be further defined an input corresponding to 'the user presses the key and holds for a period exceeding X seconds' where X is a configurable value. Also it can be further defined an input corresponding to 'the user double-click on the key'.

As seen, different key entry operations may correspond to different character sets.

The second main function of layout mapping module 402 is to store all the keyboard layouts possibly used and switch as needed. There is only one current active keyboard layout at one time, which is the current keyboard layout in the input region of keyboard that is visible to user.

In the preferred embodiments of the invention, the user may switch current keyboard layout through the gesture on the touch screen, as well as through a certain specified key on the hardware keyboard.

Thirdly, the layout mapping module 402 maps the user's initial input to a possible character set corresponding to the present input according to current keyboard layout. One preferred data structure of the character set may contain an ambiguous input character set, a precise input character, and an error-correction character set.

For example in the QWERTY layout as shown in FIG. 1A, when the user presses key 'qw' and release it directly, the module may first obtain the coordinates of contact point from the input module 401 and then determine the key entry is on the key 'qw' according to current layout. Due to the act of clicking and releasing directly, the corresponding ambiguous input character set ('q', 'w', 'l', ';') may be obtained according to current layout. The error-correction setting may be read as vertical error-correction from the setting module 403, and the characters 'a' and 's' below are therefore obtained from current layout as the error-correction characters. As a result of the present key entry, the character sets outputted from the layout mapping module 402 are as below: ambiguous input character set ('q', 'w', 'l', ';'), precise input character (null), and error-correction input character set ('a', 's').

As a further example, in the nine-key layout shown in FIG. 1D, the layout information corresponding to the key 'jkl' may be as below:

The position and size of the key on the keyboard layout are
The characters displayed on the key and corresponding positions thereof: 'j', 'k', 'l', number '5', full stop '.'
The character set corresponding to different user actions:
Click and release immediately: ambiguous input of 'j', 'k', 'l', and '5'
Press and hold: go into SHIFT mode (like the SHIFT key is pressed in the keyboard of a computer)
Move left: precise input of 'j' in normal mode; precise input of 'J' in SHIF mode
Move right: precise input of 'l' in normal mode; precise input of 'L' in SHIF mode
Move upwards: precise input of 'k' in normal mode; precise input of 'K' in SHIF mode
Move downwards: precise input of full stop '.' in normal mode; precise input of '5' in SHIFT mode When the user clicks on the key 'jkl' and releases directly, the layout mapping module 402 obtains above layout information for the key 'jkl'. Because the user action is clicking and releasing directly, the ambiguous input character set is ('j', 'k', 'l', and '5'); also because the error correction is set into left-right error-correction in the setting module 403, the error-correction character set is the adjacent characters ('m', 'i') surrounding the key 'jkl'.

If the user presses the key 'jkl', moves left and then holds for extended time (or presses and holds for extended time and then moves left), since the user input contains a press and hold action, the keyboard therefore switches into SHIFT mode and the precise input character is ('J'), and the ambiguous input character set is (null). According to the setting information in the setting module 403, when the precise input is not null, no error correction is needed by the system. Thus, the error-correction character set is (null) as well.

As seen, the layout mapping module 402 may convert effectively the user's input to character sets regardless of the keyboard layout, and as a result there's no need for the candidate word module 404 subsequently to modify the software or data structure based on different layouts. After the keyboard layout is changed, the layout information as acquired by the layout mapping module 402 may be changed accordingly, whereby the output character sets are changed.

Because of the independent design of keyboard layout, the keyboard layout may be predefined by the mobile phone manufacture, or customized by the user, without any adverse influence on the system function. For example, the user may define, by themselves, layout of key position, corresponding characters on each key, corresponding character set of the user action, resulting a keyboard layout suitable for the use habit of the user. Meanwhile, different languages of an input method may correspond to different keyboard layouts.

Referring back to FIG. 4, the candidate word module 404 may add the character set corresponding to the present input into the input sequence to locate the corresponding words in the dictionary module 405, sequence the candidate words based on priority according to a certain rule (such as, word frequency, contextual phrases, relevant words), and output the candidate words to the output module 406.

Ones skilled in the art will appreciate, the dictionary structure may be implemented in various manners, e.g., the dictionary structure may be stored in database, or stored in the form of tree. Accordingly, the possible candidate words may be located in the dictionary in many ways.

Figure 8:
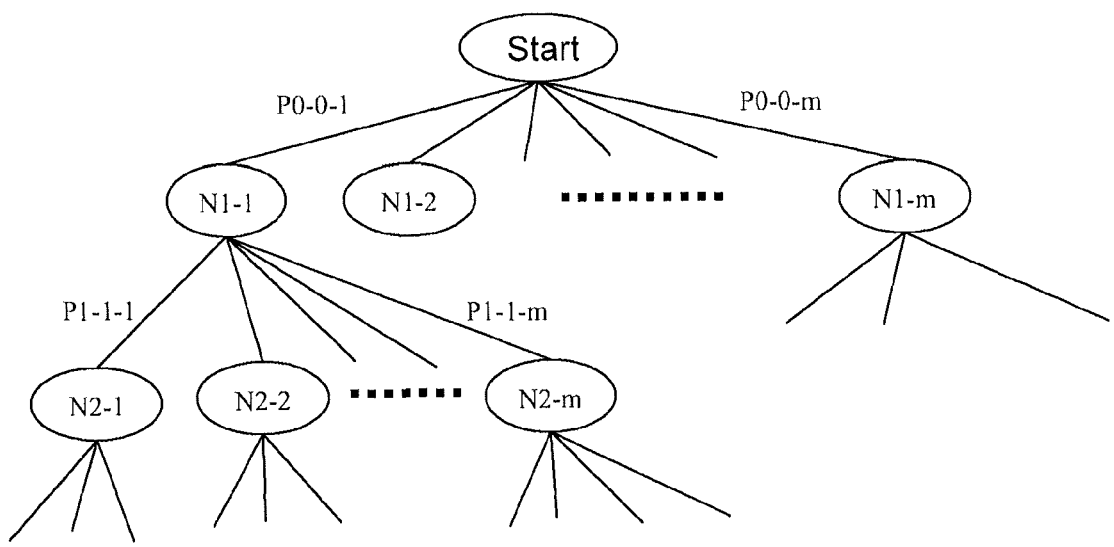
FIG. 8 is a schematic diagram illustrating a dictionary structure implementing the fast location of candidate words according to embodiments of the invention.

For the purpose of fully explaining the feasibility of the system, a method of implementing the dictionary is described where words can be located quickly, by way of example, however the invention is not limited to such a method. In the method, the words of the dictionary are arranged into a tree structure as shown in FIG. 8. In the dictionary of tree structure, each node such as Ni-1, Ni-2 . . . Ni-m represents one character, where variable i represents the depth of the node in the tree (the i-th layer). A node in the i-th layer represents the i-th character of a word. Variable m represents the sum of the characters in the layer. For example, there're 26 letters in English, and variable m may not exceed 26. However, if the dictionary contains some words consisting of additional symbols, such as "don't", variable m may exceed 26. The nodes are connected through paths Pi-j-1, Pi-j-2, . . . Pi-j-m, where i-j indicates that the parent node connected with these paths is Ni-j. The sequence of nodes along the path from the root node down to a specific node may be referred to the character sequence of the specific node (or the character sequence of the said path). If the character sequence of a node is a word in the dictionary, the said node may be referred to a word node. If some path does not exist, then it indicates that the character sequence of the path is absent in the dictionary. For example, the nodes corresponding to English word 'apple', a-p-p-l-e, are the result of the sequential search from the root node downwards. The node corresponding to the first letter 'a' is located in the first layer of the tree, the node corresponding to the second letter 'p' is located in the second layer of the tree, and the node corresponding to the last letter 'e' is the word node. The character sequence is 'apple'. The advantage of such a tree structure is that it can be determined quickly whether a particular character sequence is a word in the dictionary, and if so, the node corresponding to the word.

Each word node correspond to one word object, nevertheless, the data structure of the word object is independent of the dictionary structure. One word object may contain information as below: statistical word frequency, relevant words, rule of contextual association, substitute format and the like. The statistical word frequency of a word may be represented by a number such as numbers 1-8, where 1 represent the most commonly used word, and 1 represents the lest commonly used word. The statistical word frequency may be an important factor taken into consideration in the sequencing of candidate words based on priority. The higher the word frequency is, the higher the priority is, assuming only the factor of word frequency is considered.

Relevant words refer to the other words associated with a word, such as the plural form of a noun, different tenses of a verb, different part of speeches of the word, and the like. For example, the relevant words of the word 'jump' includes 'jumps', 'jumping', 'jumped', and the like. The relevant word list may be implemented in the manner of pointer, i.e., one word object may point to other word objects associated therewith. The purpose of reserving information for relevant words is to facilitate the user to choose other associated words from one word quickly. For example, when it is seen the word 'jump' appears in the candidates, all of the relevant words may be displayed through a certain prescribed act (e.g., slide the word up and down), and one may select among these relevant words.

The rule of contextual association contains information such as common phrase collocation, syntax criteria and the like, relating to the context. For example, the rule of contextual association of word 'look' may contain common phrase collocation such as 'look at', 'look forward to', 'look for' and the like. As a further example, the rule of contextual association of word 'am' may contain common phrase collocation such as 'I am'. As a further example, the rule of contextual association of word 'of' may contain syntax criteria: 'followed by a word being a noun or a gerund'. With such information, the system may determine intelligently the priorities of the candidate words according to the context.

In the present embodiment, the rule of contextual association may take effects when involving the relevant words. For example, when the rule of contextual association contains 'look forward to', the word 'looking' can still be associated with 'forward to' as 'looking' is the relevant word of 'look'.

Substitute format is a form of representation of the word. For example, 'asap' is the abbreviation of 'as soon as possible'. Then, if the user inputs 'asap', 'as soon as possible' may be found automatically by the system. As such, 'as soon as possible' is the substitute format of the word object 'asap'. As a further example, the user's input 'dont' can be corrected into 'don't' automatically, since the word object 'dont' contains a substitute format 'don't'. Now, the word object 'dont' is actually an index. When a word object has a substitute format, the candidate word module may prefer to output the substitute format.

Figure 9:
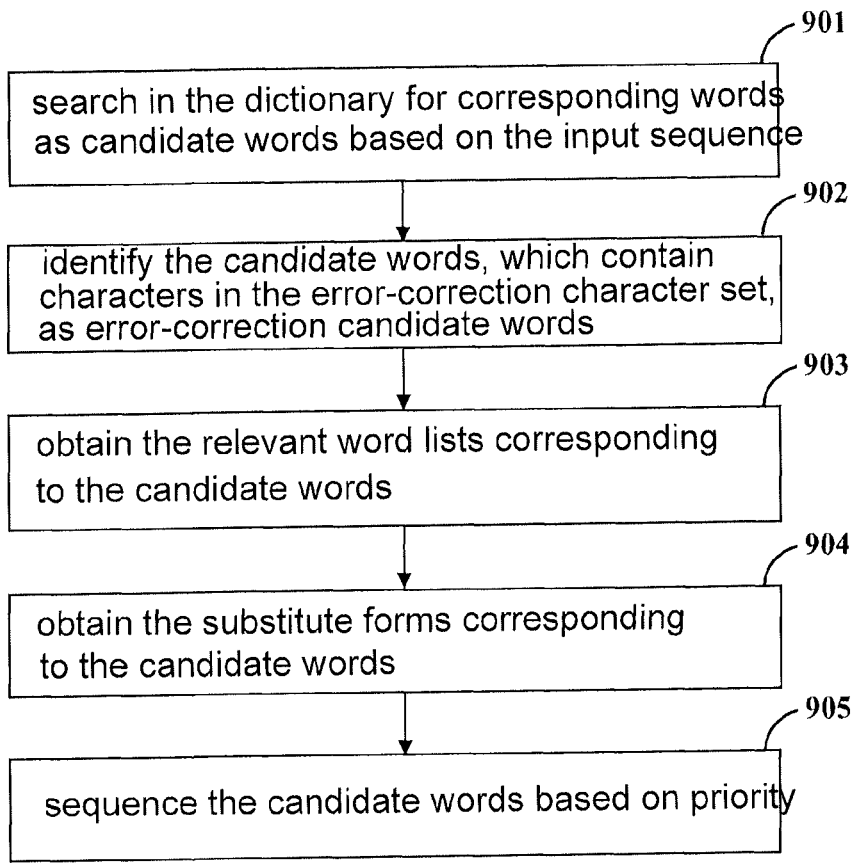
FIG. 9 illustrates a flow diagram for generating candidate words according to embodiments of the invention.

FIG. 9 illustrates a method of generating candidate words according to the present embodiment, including: searching in the dictionary for corresponding words as candidate words based on the input sequence (step 901); identifying the candidate words that contain characters in the error-correction character set as error-correction candidate words (step 902); obtaining the relevant word lists corresponding to the candidate words (step 903); obtaining the substitute forms corresponding to the candidate words (step 904); sequencing the candidate words based on priority (step 905).

Regarding step 901, the candidate word module 404 combines the input sequence consisting of the character sets corresponding to the respective key entry obtained from the layout mapping module 402 into possible candidate words. In theory, a candidate word list can be formed as long as all the characters of the input sequence are permutated and combined, and those combinations forming words in the dictionary module are selected. In fact, one key entry may contain multiple possible characters, and a number of key entries may form a huge number of character sequences. As the length of the input sequence increases, it is really computational intensive to list all the permutations of character sequences and then to lookup the dictionary. Thus, in the invention it is provided a preferable method for the location of candidate words where a dictionary tree is utilized to exclude impossible character sequences quickly through the searching for nodes in the tree. For example, if the character sets inputted are ('a', 's') for the user's first key entry, ('b', 'n') for the second key entry, and ('t', 'y', 'u') for the third key entry, respectively, the combinations of the character sequences for the three key entries will be 2*2*3=12. Nevertheless, having analyzed the character sequences for the first two key entries: 'ab', 'an', 'sb', 'sn', it will be found that the words beginning with the sequence 'sb' are absent in the dictionary (i.e., the path is null). Thus, only the possible combinations of 'ab', 'an', 'sn' with the last three character need to be considered. Having further analysis, among the permutations of all of the three characters, only 'ant', 'any', 'aby' and 'abu' are likely to become a word or a beginning of a word. Thus, the possibly actual combinations will be much smaller than 12. As the number of user's key entries increases, the amount of computation may always maintain at a low level with the impossible paths are excluded through such a method, although the theoretically possible combinations of character sequences increases.

Regarding step 902, when the input sequence contains the error-correction character sets, the candidate words found in step 901 include corrected words which are therefore identified as error-correction candidate words so as to be distinguished from normal, non-corrected candidate words. Statistically, there's a higher probability of pressing keys right by user than that of pressing keys wrong. Accordingly, in the subsequent priority-based sequencing, the priorities of error-correction candidate words may be lower than those of normal candidate words.

Regarding step 904, the substitute forms found may be used to replace original candidate words and added to the candidate word list.

Regarding step 905, the candidate word location module 404 may need to sequence the candidate words based on priority. The factors having an impact on the priority may include: the rule of contextual association, the statistical word frequency, the length of candidate word and the like. Firstly, it is preferable to consider the rule of contextual association. For example, if 'look forward' has been inputted previously, the next word is very likely to be 'to', rather than the word 'go' which is similar thereto and also has a high word frequency. By comparing against the rule of contextual association as well as the preceding and following text for current position, a candidate word may be assigned a higher priority if the candidate word forms phrase collocations with preceding and following text. Secondly, the word frequency of a word may be taken into account such that a higher word frequency, which means a higher probability of occurrence, amounts to a higher priority. Furthermore, when the length of a candidate word equals to or approximates the number of key entries by the user, the priority of the word may be increased. If a candidate word contains error-correction characters, the priority of the candidate word may be lowered. In a preferred embodiment, the final priority may be calculated as a weighted sum of a plurality of factors.

Referring back to FIG. 4, the output module 404 may display the candidate word list to the user. In some embodiments of the present invention, the candidate words having relevant words may be marked with a particular form, and a shortcut may be defined to allow the user to have access to a select mode where the relevant words of the word may be selected. For example, referring to FIG. 2A, there's an arrow below the word 'compare' which indicates a list of relevant words is found. The user may switch to the select mode for relevant words by sliding the contact point on 'compare' downwards. In some embodiments of the invention, the error-correction candidate words may be identified in different formats for the sake of distinction.

Figure 2C:
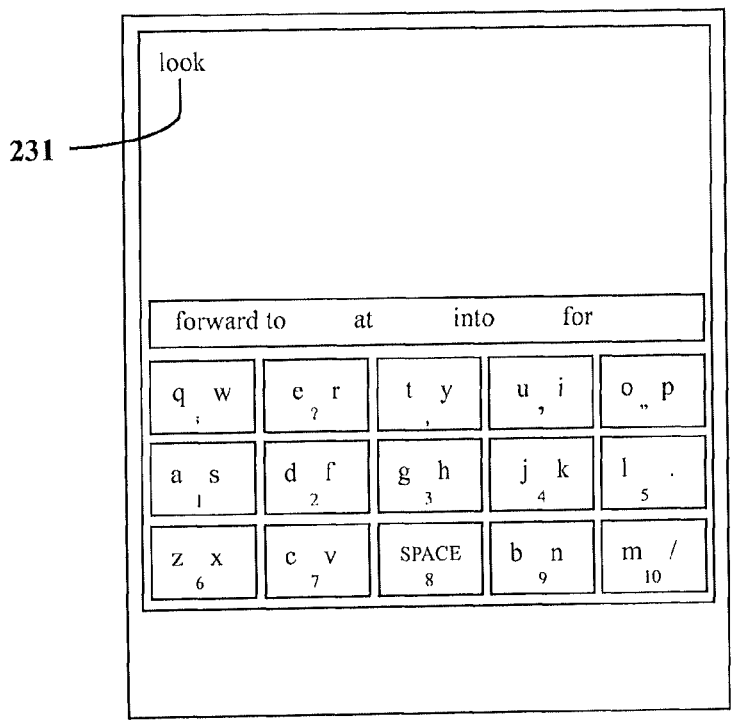
FIGS. 2C-2D are schematic diagrams illustrating the prediction of a next word based on previous text.

According to one embodiment of the invention, after a certain candidate word is confirmed by the user and inputted into the text region, the candidate region may display the next one or more possible words. Referring to FIG. 2C, after the user inputs 'look', the prediction of the next words, such as 'forward to', 'at', 'into', 'for', are displayed in the candidate region. This is because the rule of contextual association for the word object 'look' contains the phrase collocations, 'look forward to', 'look at', 'look into' and 'look for'. After the user confirms the candidate word 'look', the candidate word module 404 finds these collocations among the contextual association rule for the word and display the portions following 'look' as candidate words in the candidate region.

Figure 2D:
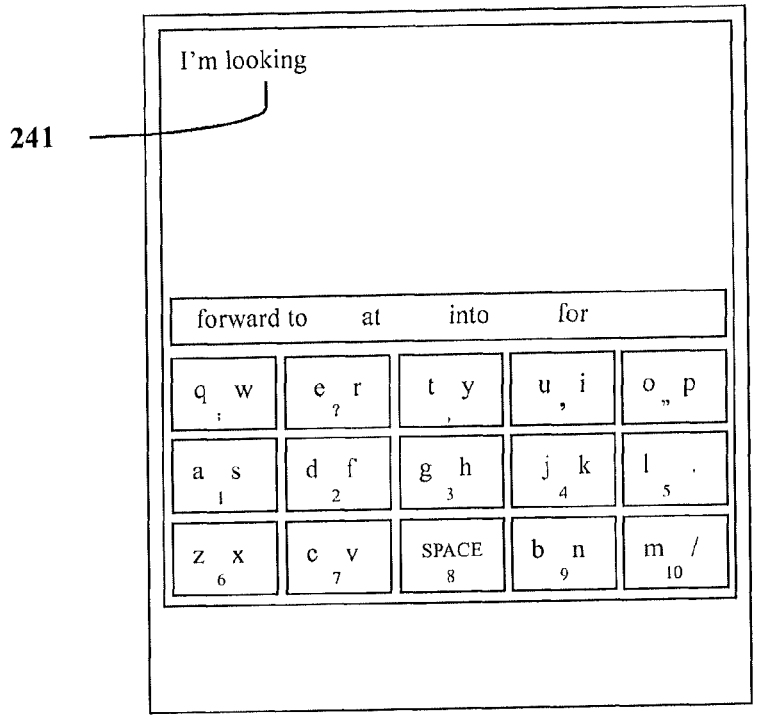

According to one embodiment of the invention, after a certain candidate word is confirmed by the user and inputted into the text region, the phrase collocations for the relevant words of the candidate word may also occur in the candidate region. Referring to FIG. 2D, after the user inputs 'I'm looking', the prediction of the next words, such as 'forward to', 'at', 'into', 'for', are also displayed in the candidate region. This is because the word 'look' is present in the list of relevant words of the word object 'looking', and the candidate word module would search for phrase collocations from the rule of contextual association for the relevant words and display the found collocations in the candidate region.

Figure 10:
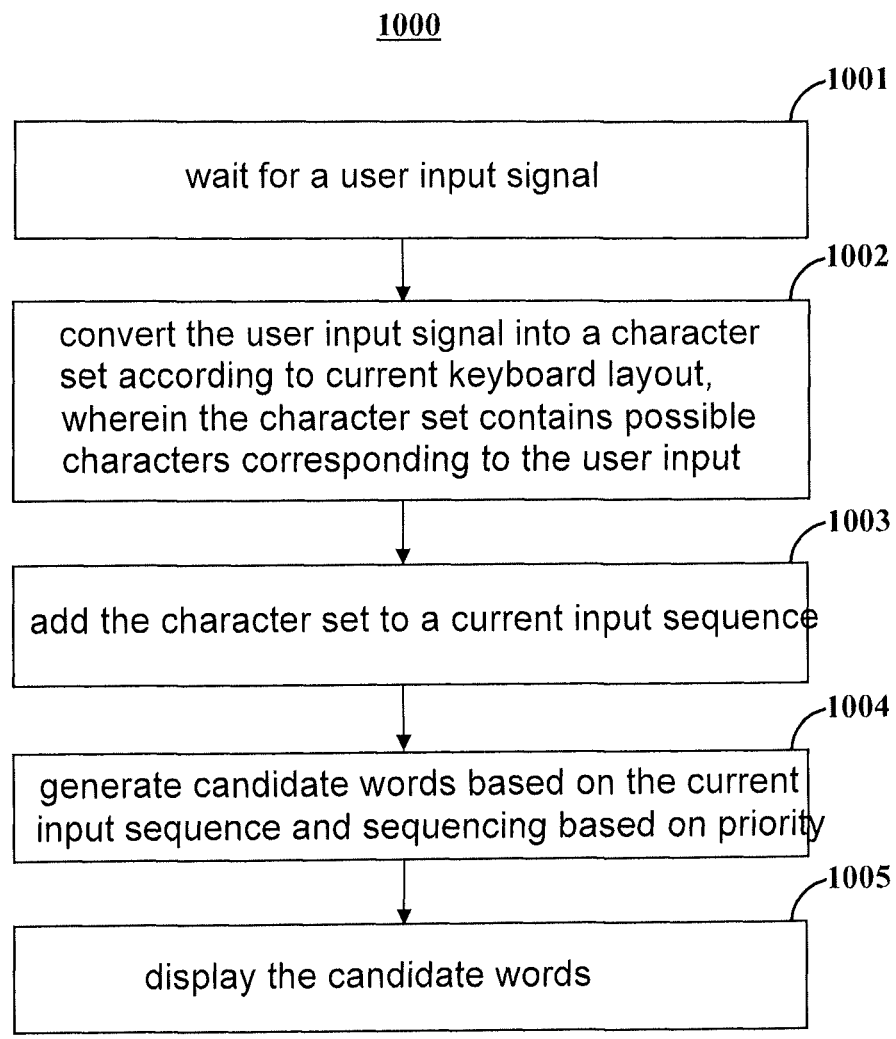
FIG. 10 is a general flow chart illustrating a method of implementing flexible keyboard layout for inputting text to an electronic device according to embodiments of the invention.

FIG. 10 illustrates a method implementing a flexible keyboard layout for inputting text into an electronic device according to the invention, including: waiting for a user input signal (step 1001); converting the user input signal into a character set according to current keyboard layout, where the character set contains possible characters corresponding to the user input (step 1002); adding the character set to a current input sequence (step 1003); generating candidate words based on the current input sequence and sequencing based on priority (step 1004); and displaying the candidate words (step 1005).

3. Switch and Dynamic Adjustment of Layout

Due to the flexible design of keyboard layout, the keyboard system of the invention may dynamically change the keyboard layout without any impact on the implementation of the system and the end user usage.

According to some embodiments of the invention, the user may dynamically switch keyboard layout through a certain predefined operation. For example, on touch screen, when the user slide the contact point on the keyboard region, the system may dynamically switch the current layout from the QWERTY layout as shown in FIG. 1A to AZERTY layout as shown in FIG. 1C. In a device with a hardware keyboard, when the user presses a certain shortcut key, the system may also dynamically switch the keyboard layout.

Figure 11A:
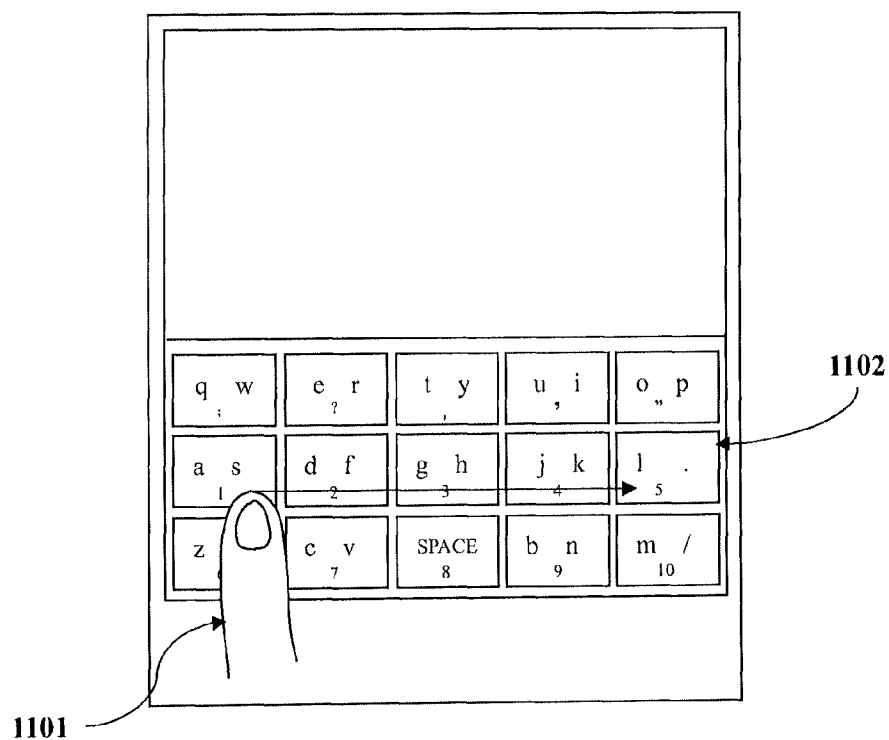
FIGS. 11A-11C are schematic diagrams illustrating a process of fast switching keyboard layout according to embodiments of the invention.
Figure 11B:
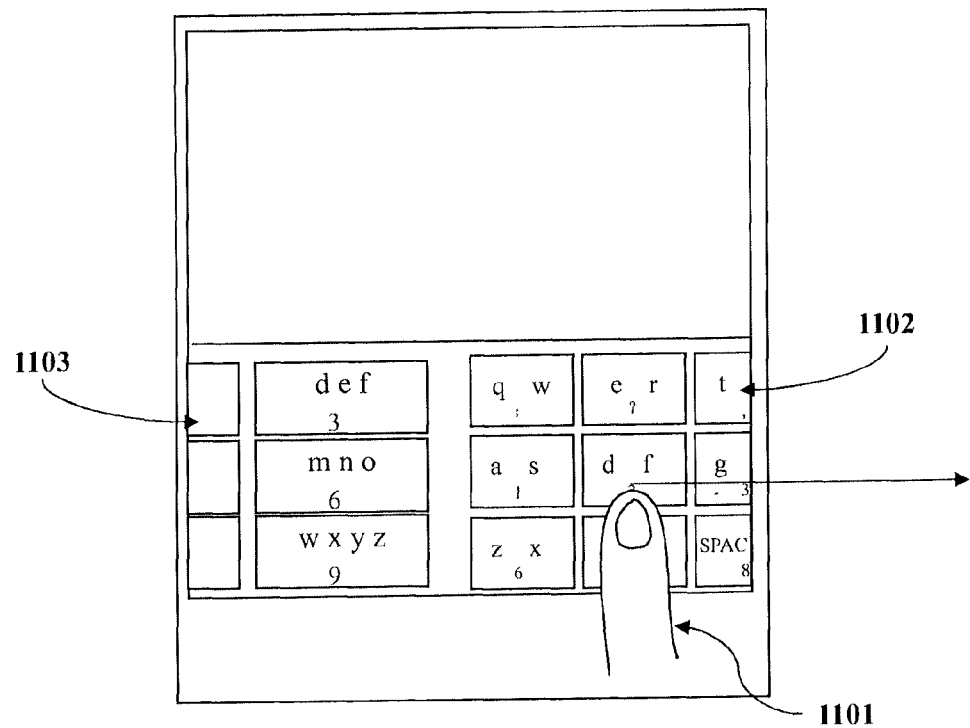
Figure 11C:
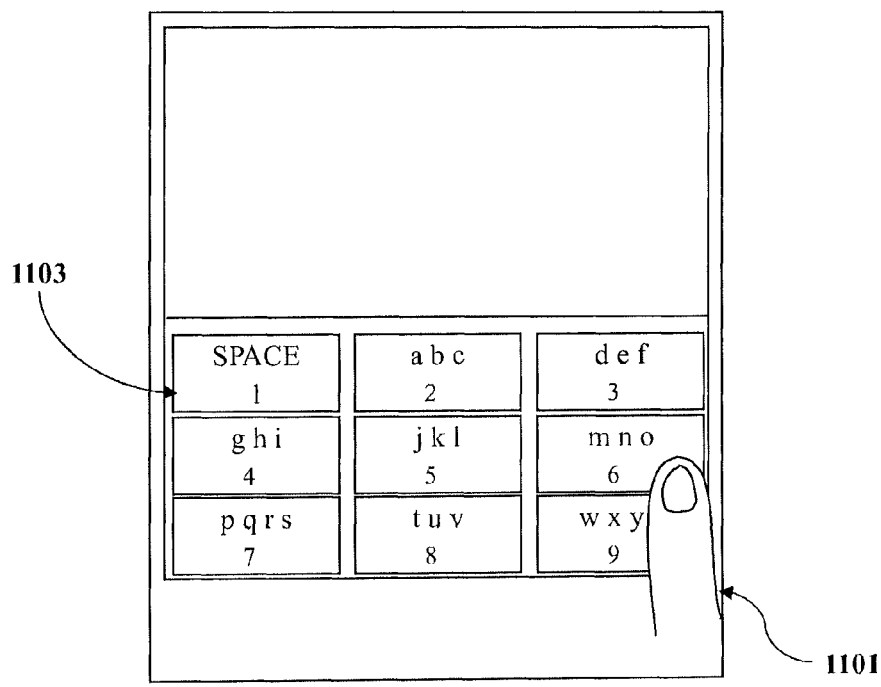

According to some embodiments of the invention, during the switch of keyboard layout, animation effects may be utilized to make the switch process seem to be more natural. For example, referring to FIG. 11A, when the user slide with fingers quickly on the keyboard region on the touch screen from left to right, the original keyboard layout fades out from left to right smoothly, and a new keyboard layout fades in from the left to right of the screen smoothly. FIG. 11B illustrates a case in which, during the moving of the finger, half of the original keyboard layout 1102 moves out of the screen and half of the new keyboard 1103 moves into the screen. FIG. 11C illustrates a case in which the whole of the new keyboard moves in the screen. In the embodiment, the animation effects may operate smoothly and the moving speed may depend on the speed of moving of the contact point, such that the user feels like the keyboard layout is dragged by the user's finger.

Figure 12:
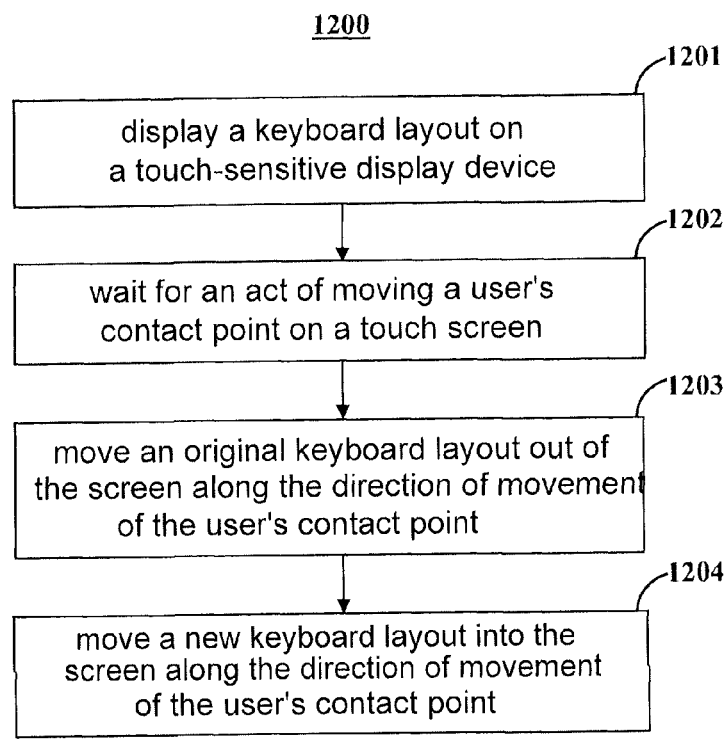
FIG. 12 is a general flow chart illustrating the implementing of fast switch of keyboard layout according to embodiments of the invention.

FIG. 12 illustrates a method 1200 of fast switching keyboard layout according to the embodiment, including: displaying a keyboard layout on a touch-sensitive display device (step 1201); waiting for a contact point movement on a touch screen (step 1202); moving an original keyboard layout out of the screen along the direction of the contact point movement (step 1203); and moving a new keyboard layout into the screen along the direction of the contact point movement (step 1204).

The keyboard layout herein is not limited to different layouts of characters, but generally refers to certain page among a plurality of pages of contents. For example, there're a number of page options on a symbol option page and the user may turn over the pages by such a method.

Figure 13A:
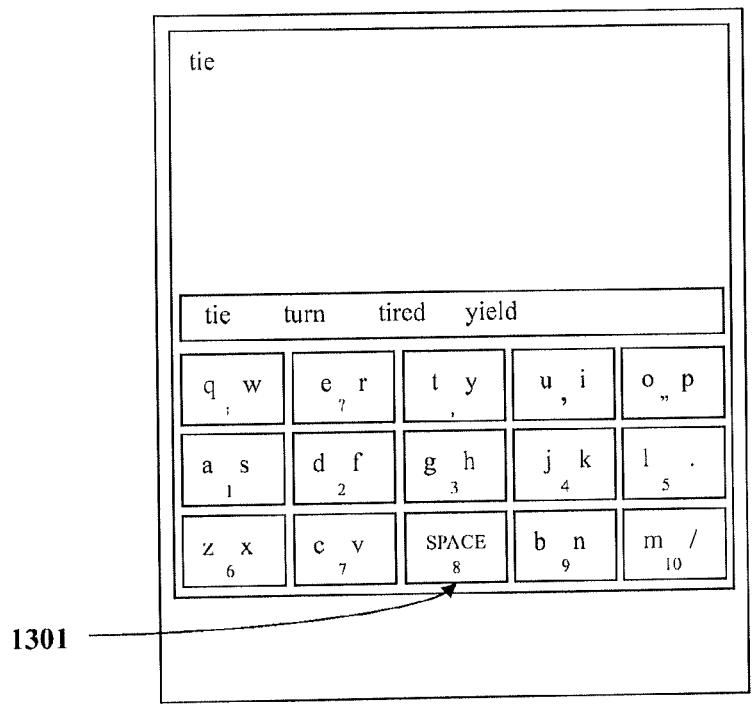
FIGS. 13A-13B are schematic diagrams illustrating a process of dynamically changing the keyboard layout according to embodiments of the invention.
Figure 13B:
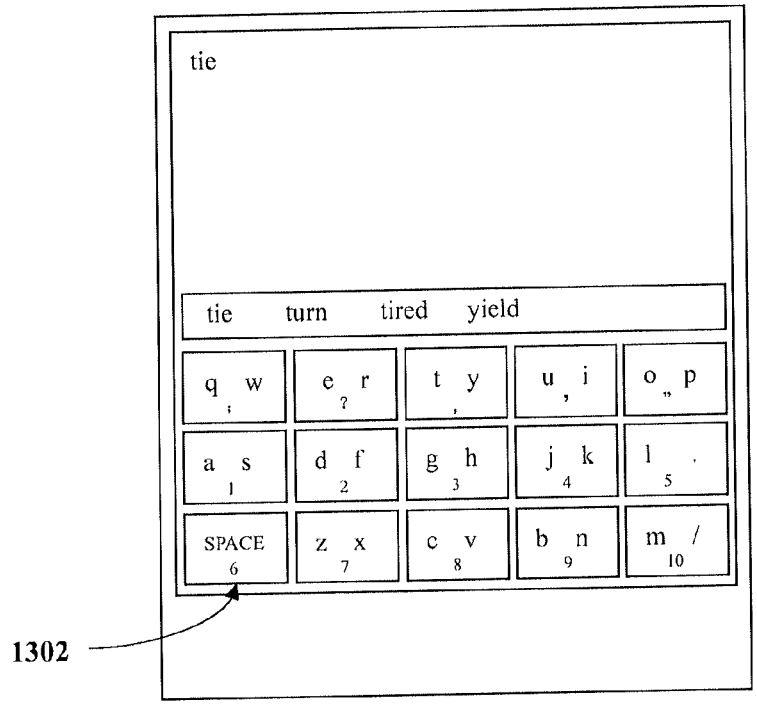

According to some embodiments of the invention, the user may dynamically change the layout of the keyboard, such as the position of the key. For example, in FIG. 13A, when the user presses and maintains the 'SPACE' key, drags it to the bottom left corner of the keyboard region and then releases it, the key will be arranged to a new position 1302 as shown in FIG. 13B. Meanwhile, the keyboard layout will be updated accordingly. For example, the number '8' initially located on the space key is changed to the number '6' to preserve the continuity of the numbers.

Figure 14:
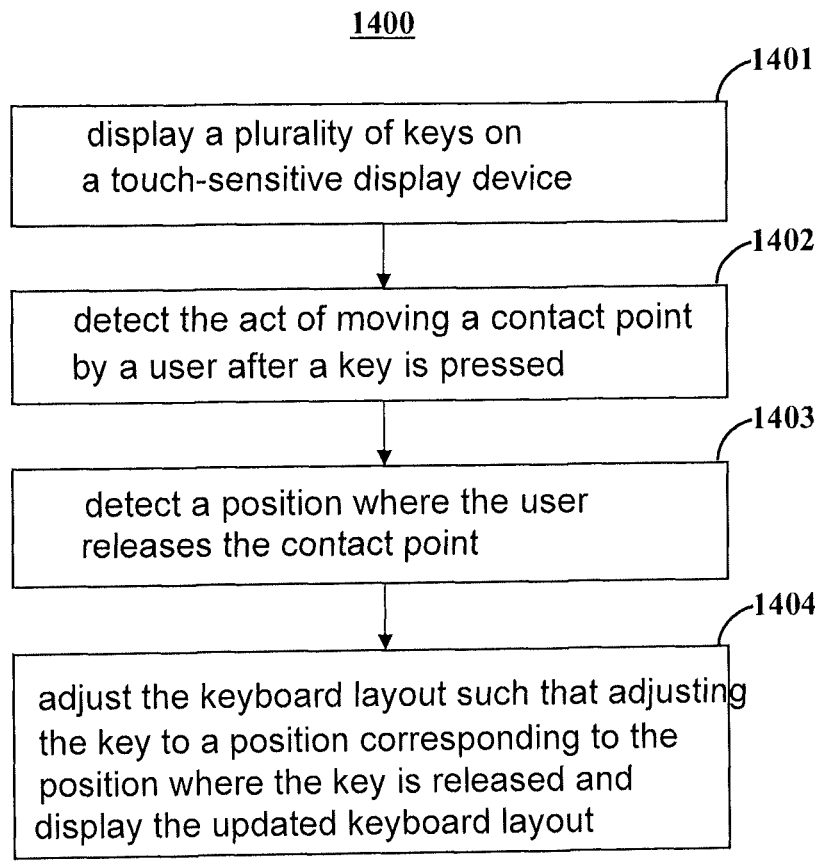
FIG. 14 is a general flow chart illustrating a process of dynamically changing the keyboard layout according to embodiments of the invention.

FIG. 14 illustrates a method of dynamically changing the keyboard layout according to the embodiment, including: displaying a plurality of keys on a touch-sensitive display device (step 1401); detecting the contact point movement by a user after a key is pressed (step 1402); detecting a position where the user releases the contact point (step 1403); adjusting the keyboard layout such that adjusting the key to a position corresponding to the position where the key is released and displaying the updated keyboard layout (step 1404).

Regarding step 1402, some keys may be preset as movable keys and some other keys may be preset as immovable keys. For example, the 'SPACE' key in FIG. 13A is a movable key, and other keys are immovable keys.

Regarding step 1404, the adjusted key tends to be located on some predefined positions around the position where the contact point is released. For example, when the position where the contact point is released falls within an area covered by 'SPACE' key in FIG. 13B or within a distance not exceeding X pixels (X may be a predetermined value) from the area, the corresponding adjusted position will always be the key position on the bottom left of the screen.

What is claimed is:

1. A method of changing a keyboard layout on a device having a touch-sensitive display, comprising:
   displaying a keyboard on the touch-sensitive display comprising a first key and a second key, wherein the first key and the second key are multicharacter keys each comprising more than one characters assigned thereto;
   pressing the first key on the keyboard to form a contact point on the touch-sensitive display;
   moving the contact point to a second location on the keyboard, wherein the second location is within a predetermined distance from or in an area covered by the second key; and
   releasing the contact point at the second location so that at least one and less than all of the characters assigned to the first key is reassigned to the second key.

2. The method of claim 1, wherein the device comprises:
   an input module, configured to detect a series of user inputs, wherein a user input is a predefined interaction with the virtual keyboard displayed on the electronic device, wherein the virtual keyboard comprises a plurality of multicharacter keys;
   a layout mapping module connected to the input module, wherein the layout mapping module is configured to map each user input to a character set, wherein a user input of contacting a multicharacter key is an ambiguous input or a precise input;
   a dictionary module, configured to store candidate words;
   a candidate word module connected to the dictionary module and the layout mapping module, wherein the candidate word module is configured to generate an input sequence, and to select candidate words from the dictionary module that match the input sequence; and
   an output module connected to the candidate word module, and configured to display at least one of the candidate words,
   wherein the input sequence is updated after each user input by adding to the input sequence the character set mapped to said user input, wherein the candidate words are updated after each update of the input sequence,
   wherein the input sequence includes the ambiguous input character set and the precise input character set.

3. The method of claim 2, wherein multiple keyboard layouts use a same data structure.

4. The method of claim 1, wherein the first key comprises a first letter and a first number and the second key comprises a second letter and a second number, and after releasing the contact point at the second location, the first key comprises the second letter and the first number while the second key comprises the first letter and the second number.

5. The method of claim 1, wherein the keyboard comprises a plurality of keys, wherein at least one of the plurality of the keys cannot be moved.

6. The method of claim 1, wherein the characters assigned to multicharacter keys are chosen from letters, numbers, or symbols.

* * * * *